Patented Sept. 20, 1932

1,878,203

UNITED STATES PATENT OFFICE

GROVER D. TURNBOW, OF DAVIS, CALIFORNIA

FOOD PRODUCT AND METHOD OF MAKING SAME

No Drawing.    Application filed September 9, 1927. Serial No. 218,581.

This invention relates to improvements in food products and method of making the same.

In its broader aspect the invention contemplates the production of a food product for imparting smoothness of texture and stability to products embodying the same, particularly to such a product as is commonly known as water-ice. A water-ice made in accordance with the present invention will be found to possess distinct characteristics from similar products which have been made up to the present time.

It is, of course, a matter of general practice of manufacture to prepare ices for commercial distribution but, nevertheless, several difficulties have been encountered with this and similar products in almost all instances. For instance, one of the difficulties experienced is referred to as "petrified" ice, a product which is characterized by the formation of the material in containers into a crust of ice which is quite solid, varying in thickness from one-eighth to as much as one inch, depending upon the time the ice has been standing without being disturbed. This so-called "petrified" ice must be broken up and discarded. In addition to the loss thus sustained, the development of this condition is also injurious to the quality of the remaining product.

A second trouble encountered is referred to in the industry as "bleeding". This "bleeding" is the formation or accumulation in the bottom of the container of a body of syrup usually of such density as to remain in liquid form in the bottom of the container. When "bleeding" occurs the quantity of syrup in the bottom of the container ranges from a comparatively small amount to as much as one-sixth of the total quantity of the product. In addition, this "bleeding", which is really a concentration of the sugar in the bottom of the container, results in the remainder of the ice becoming very rough and coarse due to the formation of comparatively large ice crystals. This, of course, is very undesirable and can properly be said to be another defect in the final product.

It is the elimination of these foregoing defects or undesirable characteristics which constitutes the objects of the present invention. That is, the invention contemplates a food product, and especially a water ice, wherein the formation of "petrified" ice and "bleeding" are obviated. More specifically the present invention seeks to replace gelatin and certain gums heretofore used almost entirely or wholly, utilizing in lieu thereof certain colloids which will impart to the final product an unusual degree of stability, smoothness of texture, excellence of flavor, and a high keeping quality.

Accordingly, it is proposed to use a certain amount of agar, usually 0.15 to 0.20 of one per cent of the liquid content of the ice and, in combination therewith pectin, usually 0.30 to 0.35 of one per cent of the liquid content of the ice. The amount of pectin used depends primarily upon the degree of smoothness desired in the finished product, the jellying effect of the pectin and the smoothness of texture in the product being increased in accordance with increases in the quantity of pectin used. Pectin which has been standardized on the basis of its jellying properties may be purchased but the pectin used and referred to herein was standardized so that one pound would jellify one hundred and sixty (160) pounds of sugar in a sixty-five (65) per cent solution at room temperature.

The use of agar in combination with the pectin has been found to be highly desirable for several reasons. For instance, pectin produces a jell which possesses considerable elasticity but which is somewhat lacking in stability unless substantial quantities are used, so that, by the use of agar, which imparts stability to the product, the amount of pectin necessary is reduced. It should be understood, however, that the agar is not indispensible. In other words, pectin possesses the property of imparting elasticity to the product but not stability while agar is somewhat lacking in elasticity while it possesses the property of imparting stability to the product, so that by utilizing these two ingredients the final product will possess both elasticity and stability. In addition to giving elasticity to the product, the pectin also noticeably increases the smoothness of the product.

With water ices containing in the neighborhood of 30 to 40 per cent air gelatin may be entirely dispensed with but in the event it is desired to incorporate greater percentages of air in the ice it has been found advantageous to add a small percentage of gelatin. For instance, if it is desired to incorporate 80 per cent air to the mixture approximately 0.07 of one per cent of gelatin added to the mixture will permit this to be accomplished with ease. This amount of gelatin may be used without any substantial fading of color resulting therefrom. The use of the gelatin also has the effect of adding to the stability of the finished product, similar to that obtained through the use of agar.

In connection with the foregoing procedure, it has been found very desirable to use certain quantities of corn sugar, usually 6 to 7 per cent of the liquid mixture. In the preparation of an ice possessing the most desirable qualities, it has been found that the hardness of the finished product should be as nearly as possible the same as ice cream when the two are held at the same temperature. One advantage of this equality in firmness, is that the two products, ice and ice cream, can be conveniently stored in the same cabinet. In connection with the foregoing constituents, a total sugar content of approximately 28 per cent of the ice mixture has been found necessary to produce this desired degree of hardness. It is understood, however, that this percentage is not absolute, and that it may be necessary to increase or decrease the sugar content somewhat in order to secure the desired degree of hardness. Furthermore, it might be added that the corn sugar is readily soluble in the liquid content of the mixture, thereby preventing supersaturation of the liquid and a consequent precipitation of the sugar in crystalline form. In other words, with the percentage of sugar desired, i. e., 28 percent, if sucrose is used exclusively, the saturation point of the solution is so nearly reached in the finished product that crystallization may take place. For this reason, it is desirable to replace a portion of the sucrose with the corn sugar, a replacement of approximately 25 per cent of the total amount of sucrose having been found to give very satisfactory result. A replacement of this amount would give a percentage of 6 to 7 per cent of corn sugar as just mentioned.

In practicing the present invention, the following procedure has given highly satisfactory results.

(1) Prepare, in the form of a powder, the following ingredients, weighing and mixing same according to percentages given:

|  |  | Per cent |
|---|---|---|
| (a) | Corn sugar | 85.724 |
|  | Agar | 2.857 |
|  | Pectin (160 grade) | 4.286 |
|  | Citric acid powdered crystals | 5.713 |
|  | Gelatin | 1.420 |
|  |  | 100. |

|  |  | Per cent |
|---|---|---|
| or (b) | Corn sugar | 87.517 |
|  | Agar | 2.872 |
|  | Pectin (160 grade) | 4.877 |
|  | Citric acid | 4.734 |
|  |  | 100. |

(2) Prepare 100 pounds of ice mix, using 7 pounds of the above powder, 21 pounds sucrose (beet or cane sugar) 20 pounds of fruit, and 52 pounds of water.

In preparing the ice mix, the 7 pounds of powder should be dissolved in 25 to 30 pounds of water and heated to boiling temperature, boiling not to exceed approximately one minute, as excessive boiling in the presence of the acid will reduce the jellying strength of the pectin. The solution thus prepared is then added to the balance of the mix. In case concentrated fruits (such as concentrated orange juice) are used, additional amounts of water will be necessary for diluting the fruit concentrate to normal strength. In addition to the ingredients listed, additional flavoring and coloring may be desirable or necessary, depending upon the fruit used. It should be mentioned that a good ice, smooth, palatable, of desirable flavor, and possessing good keeping qualities, should contain a uniform amount of acid, preferably 0.60 to 0.65 per cent titratable acidity, calculated in terms of citric acid. Also, air incorporated to the extent of 30 to 40 per cent of the original liquid content is generally considered as sufficient for the production of the most desirable ice from a commercial standpoint.

In the two examples of powder given above, the first will give a greater yield than the second. In both instances the agar should be ground to pass approximately a 40 mesh screen. The pectin may vary in amount, depending upon the smoothness desired in the finished product and it will be understood that if a lower grade of pectin is used a corresponding increase in the amount will probably be required. In both examples the citric acid crystals should be ground to a powder and then mixed with the other ingredients.

What I claim is:

1. The process of preparing an ice which consists in making a mixture having a water content and containing pectin, acid, sugar, agar, adding thereto a quantity of gelatin, and partially freezing the mixture with a substantial quantity of air incorporated therein.

2. A frozen food product having an acid reaction and containing agar and pectin, said product having a jell-like structure, possessing a relatively high degree of stability and smoothness of texture.

3. A frozen food product having an acid reaction, said product having incorporated therein agar, pectin and gelatin, said product being of jell-like structure possessing a relatively high degree of stability and smoothness of texture.

4. An agent for imparting stability and smoothness of texture to frozen food products of the type characterized by water ices and sherberts, said agent comprising pectin and agar.

5. An agent for imparting stability and smoothness of texture to frozen food products of the type characterized by water ices and sherbets, said agent consisting of pectin, agar, corn sugar and citric acid.

6. An agent for imparting stability and smoothness of texture to frozen food products of the type characterized by water ices and sherbets, said agent being prepared in dry powdered form, and comprising pectin and agar.

7. An agent for imparting stability and smoothness of texture to frozen food products of the type characterized by water ices and sherbets, said agent comprising approximately 86% corn sugar, 3% agar, 4½% pectin and 5½% acid.

GROVER D. TURNBOW.